US009613294B2

United States Patent
Caviedes et al.

(10) Patent No.: US 9,613,294 B2
(45) Date of Patent: Apr. 4, 2017

(54) CONTROL OF COMPUTER VISION PRE-PROCESSING BASED ON IMAGE MATCHING USING STRUCTURAL SIMILARITY

(71) Applicant: Intel Corporation, Santa Clara, CA (US)

(72) Inventors: Jorge E. Caviedes, Mesa, AZ (US); Sin Lin Wu, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 28 days.

(21) Appl. No.: 14/663,242

(22) Filed: Mar. 19, 2015

(65) Prior Publication Data

US 2016/0275369 A1 Sep. 22, 2016

(51) Int. Cl.
*G06K 9/00* (2006.01)
*G06K 9/62* (2006.01)
*G06K 9/20* (2006.01)

(52) U.S. Cl.
CPC ....... *G06K 9/6201* (2013.01); *G06K 9/00624* (2013.01); *G06K 9/2036* (2013.01)

(58) Field of Classification Search
CPC combination set(s) only.
See application file for complete search history.

(56) References Cited

U.S. PATENT DOCUMENTS

| 2004/0120600 A1* | 6/2004 | Cho ....................... G06T 5/008 382/274 |
| 2005/0105610 A1* | 5/2005 | Sung ........................ G06T 5/50 375/240.01 |
| 2006/0093238 A1* | 5/2006 | Steinberg ............. G06K 9/0061 382/275 |
| 2008/0101686 A1* | 5/2008 | Sali .................. G01N 21/95607 382/149 |
| 2010/0054592 A1* | 3/2010 | Nanu ...................... G06T 5/008 382/167 |
| 2014/0270404 A1* | 9/2014 | Hanna ................ G06Q 30/0609 382/116 |

OTHER PUBLICATIONS

"Optimising Industrial Vision with Computer Vision", Analysis & Opinion, Aug. 18, 2014, Internet Document at: http://www.imveurope.com/news/news_story.php?news_id=1547, (7 pages).

(Continued)

*Primary Examiner* — Alex Liew
(74) *Attorney, Agent, or Firm* — Blakely, Sokoloff, Taylor & Zafman LLP

(57) ABSTRACT

A processor computes a measure of input image structural complexity of an input image, and searches a database of true positives to find one or more entries in the database that represent true positive images that are structurally similar to the input image. The processor compares a measure of signal quality of the input image and a measure of signal quality of one of the true positive images, as retrieved from the database, and based on the comparison updates a control variable that configures a signal quality conditioning process that is to be performed on the input image prior to processing of the input image by a computer vision processor thus improving performance of the computer vision task. Other embodiments are also described and claimed.

19 Claims, 4 Drawing Sheets

(56) References Cited

OTHER PUBLICATIONS

Peters II, Richard A., et al., "Image Complexity Metrics for Automatic Target Recognizers", 1990 Automatic Target Recognizer System and Technology Conference, Naval Surface Warfare Center, Silver Springs, MD, USA, Oct. 30-31, 1990, (pp. 1-17).
Wang, Zhou, et al., "Image Quality Assessment: From Error Visibility to Structural Similarity", IEEE Transactions on Image Processing, vol. 13, No. 4, Apr. 2004, (pp. 600-612).

* cited by examiner

CONTROL OF COMPUTER VISION PRE-PROCESSING BASED ON IMAGE MATCHING USING STRUCTURAL SIMILARITY

One aspect of this disclosure relates to computer vision, and more particularly to techniques for improving the performance of a computer vision system by automatically adjusting the control variables of basic, image conditioning operations of a pre-processing stage. Other aspects are also described.

BACKGROUND

Computer vision is a technical field in which computers process or analyze the constituent pixels of a digital image using statistical approaches, in order to produce numerical or symbolic information that reflects a visual understanding of content in the image. Examples of computer vision tasks include face detection or recognition, user interaction through gesture recognition, automatic inspection of objects, autonomous vehicle navigation, detecting events such as people counting, and organizing information such as databases of images. A computer vision processor has a computationally complex task. That task however may be made easier, by performing certain basic image conditioning operations upon the input image, in a pre-processing stage. For example, making a dark image brighter and sharper could, in some cases, enable the edges of objects therein to be detected more easily by a gesture recognition processor.

BRIEF DESCRIPTION OF THE DRAWINGS

Various aspects of this disclosure are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, a given figure may be used to illustrate the features of more than one embodiment, and not all elements in the figure may be required for a given embodiment.

DETAILED DESCRIPTION

Several embodiments with reference to the appended drawings are now explained. Whenever aspects of the embodiments described here are not clearly defined, the scope of the disclosure here is not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

It has been discovered that merely processing the input images that are input to a computer vision system, to determine if they are too dark or too blurry and on that basis adjusting their brightness, or their color or graylevel contrast, does not consistently ensure that a computer vision processor, which operates upon the adjusted input image, will be successful.

An embodiment is a digital image processing method that may help increase the likelihood of success of a computer vision task. An input image is processed to compute a measure of its structural complexity. Then, using a) the measure of input image structural complexity and b) a measure of the structural complexity of a true positive image, a measure of structural similarity of the input image to the true positive image is computed. The true positive image is one that has resulted in a satisfactory decision by a computer vision processor. In response to the measure of structural similarity indicating sufficient similarity (a match) between the input image and the true positive image, a comparison is performed between a measure of signal quality of the input image and a measure of signal quality of the matching, true positive image. Based on that comparison, a control variable that configures a signal quality conditioning process that is performed on the input image prior to processing of the input image by the computer vision processor, is updated. This may increase the likelihood of satisfactory results from the computer vision task.

Another embodiment is an image processing system in which a structural similarity calculator retrieves true positive structural complexity metrics from a database, and computes a structural similarity metric using a) a measure of input image structural complexity and b) one or more true positive structural complexity metrics retrieved from the database. A signal quality comparator performs a comparison between the measure of signal quality of the input image and the true positive signal quality metric retrieved from the database, and can update a control variable in accordance with comparison, wherein the control variable configures a pre-processor of a computer vision system.

Figure 1:
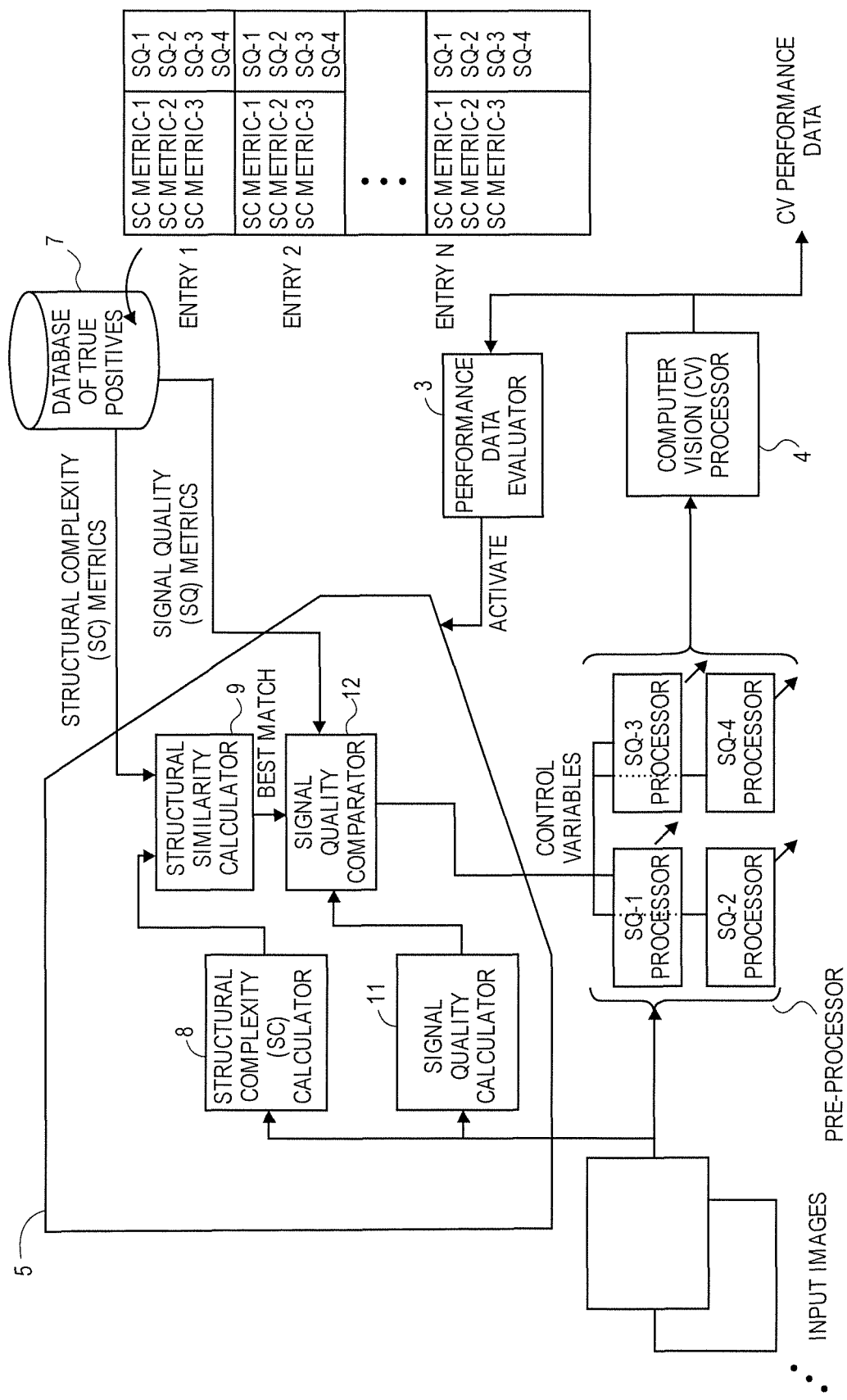
FIG. 1 is a block diagram of a computer vision (CV) system.

FIG. 1 is a block diagram of a computer vision (CV) system, part of which (as described below) performs an image processing method that may improve the success rate of the decision making by a CV processor 4 in the system. The system operates upon an input digital image sequence. Each input image may be received directly from a sensor (not shown), e.g. as part of a digital still camera, or a video camera, or it may be retrieved from a mass storage (not shown), e.g. a still image file database or a movie file database. After being conditioned by a pre-processor 2 (where this may be optional, as described in detail below), the input image is processed by the CV processor 4. A task of the CV processor 4 may be object or shape detection or recognition, gesture recognition, automatic inspection of objects, autonomous vehicle navigation, detecting events such as people counting, optical character recognition, road sign detection, medical imaging interpretation, surveillance algorithms, and organizing information such as databases of images. To achieve its task, the CV processor 4 may perform operations such as background subtraction, rotation, and segmentation as needed to facilitate for example feature extraction and decision-making. The CV processor 4 may be implemented as a neural network or a machine learning processor. The CV processor 4 produces CV performance data, which may include pixel coordinates of a feature or object recognized in the input image or a qualitative indication such as outdoors or indoors, and an indication of its confidence in or the probability that its task has been performed successfully (or its recognition decision is correct). The CV performance data may then be used by higher-level functions (not shown), such as user interaction applications and visual understanding applications.

The CV processor 4 operates upon an input image that may be pre-processed by a pre-processor 2. The latter is available to perform several, basic digital image conditioning (also referred to here as signal quality conditioning) processes upon the input image, prior to the input image being processed by the CV processor 4. The pre-processing described here is designed to make the task of the CV processor 4 easier, or even possible, if needed to improve the results of the CV task. Each of signal quality conditioning processes may be viewed as being performed by a respective signal quality (SQ) processor. The example in FIG. 1 illustrates four such processors, SQ_1, . . . SQ_4, but this is only an example as there may be as few as two or more than four, different signal quality processors. The SQ processors may include any suitable combination of the following: noise reduction, gamma (or contrast control), sharpness adjustment, and illumination compensation or brightness adjustment processors. The strength of each of the signal quality conditioning processes may be adjusted according to a single, "knob" or control variable (also referred to here as a "gain" variable). Said differently two or more of a brightness processor, a sharpness processor, a contrast processor, and a noise reduction processor are configurable by two or more control variables, respectively. It should be noted that the manner in which these control variables are set is not done with a goal of improving human visual or perceptual quality, but rather for adjusting the signal quality of the image for purposes of making the CV task easier.

In one embodiment, one or all of the SQ processors in the pre-processor 2 may be disabled or turned off during normal operation, for efficiency reasons, until a CV task is performed in an unsatisfactory manner (e.g., as determined by a performance data evaluator 3 described below) at which point the SQ processors may be enabled or turned on (in order to help improve performance of the CV processor). Indeed, in many instances, the input images are of good enough quality for the CV task to operate satisfactorily upon them. Note however that other pre-processing operations, such as resizing the input image so as to match the needed format at the input of the CV processor can remain enabled.

It has been found to be desirable to be able to automatically configure the pre-processor 2, and in particular one or more of the basic, image conditioning (signal quality conditioning) processors SQ_1 . . . SQ_4 processors, so as to improve the performance of the subsequent computer vision task. These decisions, namely how to adjust the pre-processor 2, have been found to depend on the particular content of the input image, e.g. landscape, outdoors, indoors, a hand, a face, or another object of interest, etc. A systematic approach for making such decisions based on computing a measure of the structural complexity of the input image and comparing it to that of a "true positive"image is now described.

Still referring to FIG. 1, a control variable calculator 5 is provided that computes a respective control variable or gain value that may define the strength of and direction of change to be performed by each block of basic image conditioning in the pre-processor 2. For example, the control variable SQ_1 may be brightness control having a range of −5 to +5, where zero indicates no brightness processing is to be performed upon the input image by the SQ_1 processor, +5 indicates that the strongest brightness increase process be performed, and −5 indicates that the strongest brightness decrease process be performed. A positive number may result in the input image being processed to thereby increase the average illumination therein. Other ways of defining each control variable are possible. In one example, there are four control variables, namely brightness, noise content, sharpness, and contrast, where in that the variable SQ_2 may be noise reduction, which configures any suitable noise reduction algorithm (performed by the SQ_2 processor), SQ_3 may be a gamma or contrast variable, and SQ_4 may be a sharpness variable. Other combinations of basic signal quality conditioning control variables are possible.

Sometimes, two or more of the control variables may need to be adjusted, for the same input image, where for example a noise reduction adjustment is accompanied by a gamma adjustment. It should also be noted that the adjustments made here to the basic image signal conditioning processes are not intended to make the input image appear more pleasing through a human eye; rather, they are only designed to make the job of the computer vision processor easier, e.g. increased confidence of gesture recognition. The basic signal conditioning operations may be designed to operate on input images that are of full sensor frame resolution, or they may be designed to operate on a portion of a sensor frame, e.g. a region of interest in the middle of the full sensor frame.

In addition to the control variable calculator 5, a database 7 of true positives is provided in which there are N entries. The term "database" is used generically here to refer to any suitable form of data storage formatted so that the relevant data here can be organized, e.g. as a flat file, or a look up table, for retrieval by the control variable calculator 5. Each entry of the database 7 associates a) several structural complexity (SC) metrics that have been extracted or derived from one or more previously analyzed, "well-behaved" or true positive input images, with b) several signal quality (SQ) metrics of the well-behaved image (which have also been previously computed from the well-behaved image). A well-behaved or true positive image may be an image that has previously passed through the CV system, including being processed by the pre-processor 2 and then the CV processor 4, and which has resulted in a correct decision or satisfactory CV performance data being produced, e.g. sufficiently high confidence or probability that a gesture was recognized, or that the correct shapes, faces, or other objects were recognized, or that an indoors vs. outdoors determination was correct. Said differently, the database 7 has a number N of entries, wherein each entry includes two or more true positive structural complexity metrics that are associated with two or more true positive signal quality metrics. The true positive structural complexity metrics have been derived from a respective one or more true positive images, and the true positive signal quality metrics have also been derived from the respective one or more true positive images. An example of how the database 7 may be populated is described further below in connection with FIG. 2.

The control variable calculator 5 processes the input image in order to compute a measure of input image structural complexity, of the input image. In addition, the calculator 5 obtains a measure of true positive structural complexity, of a true positive image, from the database 7. Said differently, the calculator 5 can be accessing the database 7 to retrieve one or more of the true positive structural complexity metrics in a given entry. Using these two structural complexity measures, the calculator 5 computes a measure of structural similarity of the input image to the true positive image. Note that this is not a quality score that attempts to quantify the quality of an image in relation to a reference image (e.g., following a compression and decompression operation), but rather a general-purpose measure of similarity. The measure of structural similarity may include one or more similarity metrics that can be chosen according to the CV application. As discussed below, there is flexibility in choosing the measure of structural similarity, such as using a weighted sum of partial similarity metrics or the use of non-Euclidean similarity metrics.

In response to the measure of structural similarity indicating sufficient similarity, or a "match", a signal quality comparator 12 then performs a comparison between a measure of signal quality of the input image and a measure of signal quality of the matching, true positive image. Based on that comparison, it updates a control variable that configures a signal quality conditioning process that is performed upon the input image, by one of the SQ_1, SQ_2, . . . SQ_4 processors.

Said differently, the calculator 5 accesses the database 7 for the previously determined structural complexity metrics of a population of well behaved or true positive images, finds a matching true positive image (entry), and on the basis of a) the SQ metrics retrieved from the matching entry and b) corresponding SQ metrics computed by the SQ calculator 11 from the input image, determines how to adjust the control variables that are input to the SQ processors, so as to bring the input image close to an appropriate, well-behaved image (that is represented in the database 7 by the matching entry). This adjustment to the pre-processor 2 is expected to improve the chances that the CV processor 4 will make the correct decision when performing its computer vision task upon the adjusted input image.

In one embodiment, the measure of input image structural complexity includes an input image color complexity metric (CCM), an input image lightness, or luma (Y), complexity metric (LCM), and an input image spatial complexity metric (SCM). These may be computed by a structural complexity calculator 8 (SC calculator 8), which processes the input image in order to do so. Note that more generally, there can be fewer than three structural complexity metrics, or there may be more than three. As an example, three structural complexity metrics may be defined for an image, as follows:

$$CCM = \left( \frac{(S_R + S_G + S_B + C_1)(\sigma_R + \sigma_G + \sigma_B + C_2)}{(\mu_R * \mu_G * \mu_B + C_1)(R_{RG} * R_{RB} * R_{GB} + C_2)} \right)^{1/2}$$

$$LCM = \frac{((S_Y + C_1)(\sigma_Y + C_2))^{1/2}}{(\mu_Y + C_1)}$$

$$SCM = \left( \frac{\Sigma \sqrt{Gx^2 + Gy^2}}{C3 * H * W} \right)^{1/2}$$

$$C1 = C2 = 1, C3 = 5$$

where S is entropy and may be given by −sum(p.*log2(p)) with p containing the histogram counts for the image, Rxy is cross correlation, mu is mean value, sigma is standard deviation, G is gradient, H is the height of the image, and W is the width of the image. Note also that while the above examples refer to the red, green, and blue (RGB) image planes of an input image, the techniques described in this disclosure are equally applicable to other color spaces, as well as gray level images (in which case the color complexity metric would not be needed). Alternative formulas for graylevel images:

Luma Contrast Complexity Metric:

$$LCCM = \frac{(C4 * S_L + C_2)}{(\mu_Y + C_1)}$$

Luma Complexity Metric:

$$LCM = \frac{(\sigma_Y + C_2)}{(\mu_Y + C_1)}$$

Spatial Complexity Metric:

$$SCM = \left( \frac{\Sigma \sqrt{Gx^2 + Gy^2}}{C3 * H * W} \right)$$

C1=C2=1, C3=5, C4=10

Similar to the input image structural complexity, the measure of true positive structural complexity may also include a true positive color or graylevel complexity metric, a true positive lightness complexity metric, and a true positive spatial complexity metric, which should be defined in the same manner as their input image counterparts. The structural complexity metrics of a given true positive image have been previously determined and are stored in an assigned entry in the database 7, and are accessible by a structural similarity calculator 9 (SS calculator 9).

In one embodiment, the SS calculator 9 computes a measure of structural similarity as a function of two or more of i) the input image and true positive color or graylevel complexity metrics, ii) the input image and true positive lightness complexity metrics and iii) the input image and true positive spatial complexity metrics. The SS calculator 9 computes such a measure for each of several entries in the database 7 or as many as needed until one or more "matches" are found, i.e. one or more entries each of which resulted in a sufficiently small measure of structural similarity being computed. Said differently, computing the measure of structural similarity uses a) one or more of a set of two or more input image complexity metrics that have been derived from the input image, and b) the one or more of the set of two or more true positive structural complexity metrics that were retrieved from the given entry in the database 7. For example, consider the case introduced above where the input image complexity metrics include an input image color or graylevel complexity metric, an input image lightness complexity metric and an input image spatial complexity metric. In that case, computing the measure of structural similarity may include computing a structural similarity metric that is a function of a) two or more of i) the input image color or graylevel complexity metric, ii) the input image lightness complexity metric and iii) the input image spatial complexity metric, and b) a corresponding two or more of the true positive structural complexity metrics retrieved from the given entry in the database 7.

In a particular example, the structural similarity (SS) metric can be any function of the two or more complexity metrics. An example is a generalized Euclidean distance (Generalized Structural Similarity Metric, GSSM) between the complexity metrics of the input image x and those of a true positive y (from the database 7), namely $$GSSM(x, y) = \sqrt{\begin{array}{c} k_c(|CCM_x - CCM_y|)^2 + k_l(|LCMM_x - LCM_y|)^2 + \\ k_s(|SCM_x - SCM_y|)^2 \end{array}}$$

A smaller GSSM means that the true positive of a given entry is a better match with the input image (in terms of their structural complexity).

In some cases, it may be desirable to look for a matching entry (having the smallest GSSM) only along two dimensions, rather than all three, of the GSSM formula given above. Such cases may relate to a specific application in which color or graylevel complexity is more important than illumination, i.e. more likely to impact the results of the CV task. For example, where the images are of outdoor content, color or graylevel complexity becomes more important than illumination, while illumination becomes more important for images of indoor scenes. In other words, distortion along one dimension is allowed in such cases, so that one of the dimension coefficients, kc, kl, or ks in the formula for GSSM above will be set to zero, and in particular the dimension that exhibits the largest difference in complexity metric. The SS metric in that case would be deemed a Chebyshev-complement type of metric.

Other SS metrics may use a single dimension, such as any one of color or graylevel, lightness, or spatial complexity by itself, while the other two dimension coefficients of the GSSM are set to zero.

Another example is a Chebyshev type SS metric, which uses only the largest difference between the CCMs, LCMs, and SCMs (while the dimension coefficients of the two smallest ones are set to zero). The entry that produces the smallest value of that type of GSSM may be the closest matching entry.

On the other hand, if the objective is to find true positive images which are structurally similar to the input image but not necessarily along a specific direction, we can use a Euclidean distance which is a sum of the individual differences, i.e. the square root of $(CCMx-CCMy)^2+(LCMx-LCMy)^2+(SCMx-SCMy)^2$.

Said differently, a set of SS metrics may be computed for each one of a selected group of entries of the database 7 (which group may include all N entries of the database 7). In one embodiment, the top K matching entries (where K is an integer >1), i.e. matching the input image, are found, by evaluating the SS metrics. The process then continues with computing the input image's signal quality metrics (by signal quality calculator 11) and comparing them with the well-behaved images' signal quality metrics (which are in the top K matching entries). In response, one or more of the control variables are adjusted. For example, if there is a difference between the sharpness metrics of the input image and the well-behaved image, then a proportional adjustment is made by the SQ comparator 12 to the sharpness control variable. Said differently, the updating of a control variable, wherein the control variable configures a signal quality conditioning process that is performed on the input image prior to processing of the input image by the computer vision processor 4, may include changing (increasing or decreasing) the control variable in proportion to how much, a) the measure of signal quality of the true positive image, is greater than or less than b) the measure of signal quality of the input image. It should be noted that the setting of the control variables may follow a scheme or strategy that is designed to bring the signal quality of the input image into a region where statistically it will be more likely to be recognized by the CV processor, not to exactly equal the signal quality values of the matching entries.

Note that the computation of the input image structural complexity metrics may be based on the input image having the full sensor frame resolution of for example a digital camera device that is capturing the image, i.e. a "global" computation that reaches the boundary of the full sensor frame resolution. Alternatively, the computation may be based on a portion of the full sensor frame, e.g. a region of interest such as in the middle region of the full frame. Similarly, the conditioning performed by the pre-processor 2 may be either global in reach (to the boundary of the input image) or it may be limited to a region of interest in the input image. Also, the input image may be a single color or graylevel plane (e.g., the red, green or blue plane produced Red, Green, or an achromatic gray level signal). Also, it should be noted that, if an input image to the CV system is of smaller size than a source image captured by the sensor and from which it is derived, e.g. downscaled for efficiency reasons, then the pre-processing is preferably done at that smaller resolution.

In one embodiment, to improve flexibility, more than one type of SS metric is computed by the SS calculator 9, between the input image and a given entry in the database 7. The control variable calculator 5 in that case may rely on only the most relevant ones of these SS metrics, when determining whether a given entry is a match. For instance, consider an image that does not have a lot of color or graylevel but is rich in detail or texture. In that case, an SS metric that is not a function of a color or graylevel-based structural complexity metric, but rather is only a function of luma-based and spatial-based structural complexity metrics could indicate that there is a match to the given entry, while another SS metric that is only a function of the color or graylevel-based structural complexity metric would indicate no match. Where there are multiple (different) SS metrics being computed, it may be advantageous to rank them from greatest similarity to least and then use only the top ones to determine whether or not a given entry is a match. As mentioned above, the flexibility of tailoring (using particular SS metrics in) the overall measure of structural similarity to the expected content in the input images (by relevance of color or graylevel, structural complexity, or illumination complexity) may be sufficient to guarantee that the matching process (to match one or more entries in the database 7) will work. A choice of SS metric may also include any combination of the other methods given above, as needed for the specific image content and application.

Once the top K matching entries from the database 7 have been found, a signal quality comparison is performed (by signal quality comparator 12) between a measure of signal quality of the input image and a measure of signal quality of the true positive image. For example, this may involve a particular set of SQ metrics of the input image, and the SQ metrics in the top K matching entries. In one embodiment, only the largest difference, i.e. between an SQ metric of the input image and an SQ metric in one of the K entries, is then used to set the control variable for the corresponding SQ processor. For example, where there are K=3 matching entries, only the entry that results in the largest difference in contrast is used, to compute the gain value for the contrast processor. A similar approach may be taken for all of the other SQ processor, e.g. the largest difference in brightness is used to compute the gain for the brightness processor. In one embodiment, the gain value is simply the computed difference between the SQ metric in the matching entry and the SQ metric of the input image. Note however that this choice of focusing on the largest signal quality differences does not preclude performing complementary processing which may also be needed; for example, if a matching entry leads to a finding that an illumination increase is recommended, then that may be accompanied with an increase of color saturation so as to maintain color or graylevel contrast in the presence of increased illumination (which may be desirable for improved segmentation by the CV processor).

In one embodiment, the control variable calculation is a sufficiently lightweight (and hence fast) computing process that can be activated on demand during an input image sequence, to process a current input image that may still be resident in buffer memory (before the current input image is replaced by a subsequent one of the sequence). For instance, referring back to FIG. 1, a performance data evaluator 3 may be provided that evaluates the performance data output by of the CV processor (for a particular CV task). When that data indicates that the recognition results for the current input image are not satisfactory, the control variable calculator 5 may be activated so that it can update the control variables that update the configuration (parameter settings) of the SQ processors. The CV processor 4 will then perform a second pass upon the input image, which has been pre-processed according to the updated control variables. This may increase likelihood that in the second pass, the CV performance data will be satisfactory and will be available before the next input image replaces the current image in the buffer memory.

In one embodiment, once the signal quality control variables have been updated, the CV processor 4 repeats its task on the newly adjusted input image without any verification or check being made as to whether or not the adjustment is either in the correct direction or in the correct amount. Note that multiple passes may be taken here, i.e. to update the signal quality control variables more than once, if there is enough time allowed between consecutive input images and if the performance data evaluator 3 finds that the resulting CV performance data continues to be unsatisfactory (e.g., the confidence in recognition remains too low).

Figure 2:
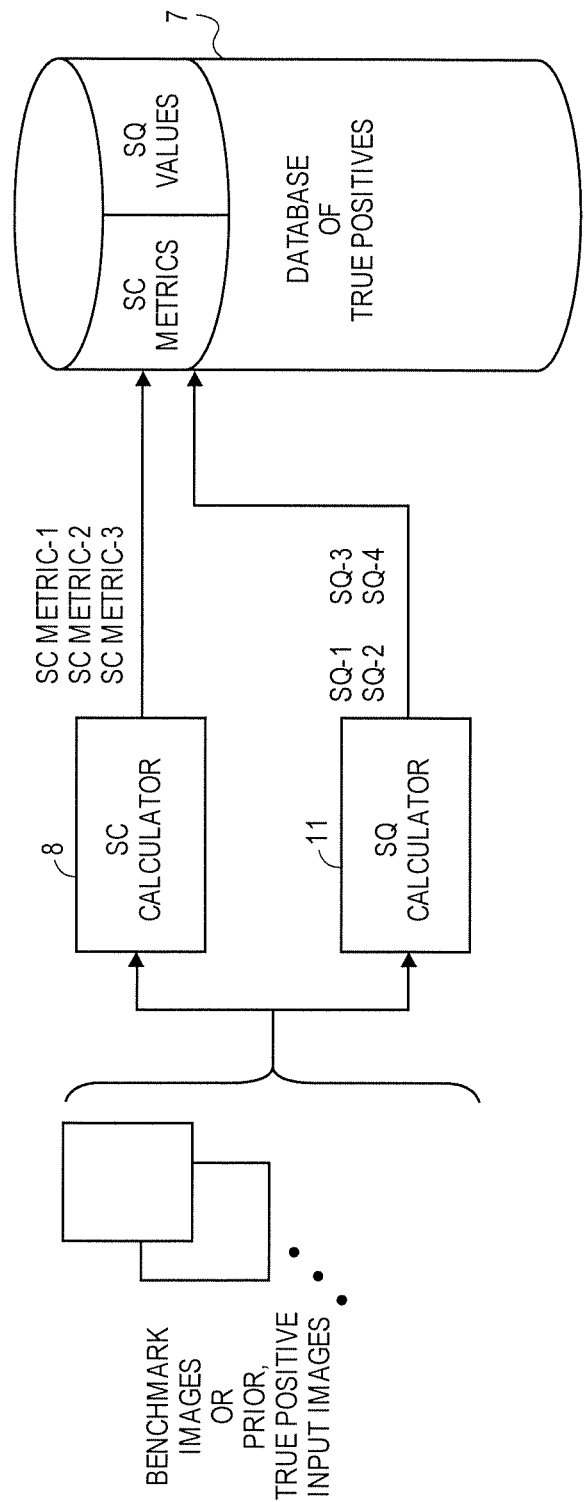
FIG. 2 is a block diagram of a system that performs a process for populating a database of true positives.

Referring now to FIG. 2, this is a block diagram of a system that performs a process for populating the database 7. The process may begin with several images being collected (e.g., benchmark images, and/or prior, well behaved true positive images which the computer vision system of FIG. 1 has correctly recognized). Since the computer vision task has correctly recognized the ground truth in such images, each of the images is then analyzed to determine certain properties that may define a measure of structural complexity (SC). In particular, the SC calculator 8 may process each image to compute two or more SC metrics for it, e.g. the SC metrics_1, _2, _3 given above. A new entry in the database 7 is created and assigned to each true positive image, by allocating storage space in which the SC metrics computed for the image are then stored. Also, a measure of signal quality is determined for each image, for example by computing two or more different types of signal quality (SQ) metrics from each image, e.g. average illumination level, sharpness, contrast, and noise level. The SQ calculator 11 described above may be used for this purpose. These representative SC metrics (which are of different types) and SQ metrics (also of different types) of a given true positive image are then written to the entry in the database 7 that is associated with that true positive image. This process is repeated until the desired number of entries, N, have been populated. Note here that the actual pixel data of the true positive images need not be written to the database 7, as storing their SC and SQ metrics are sufficient for operation of the control variable calculator 5 (described above in connection with FIG. 1).

Figure 3:
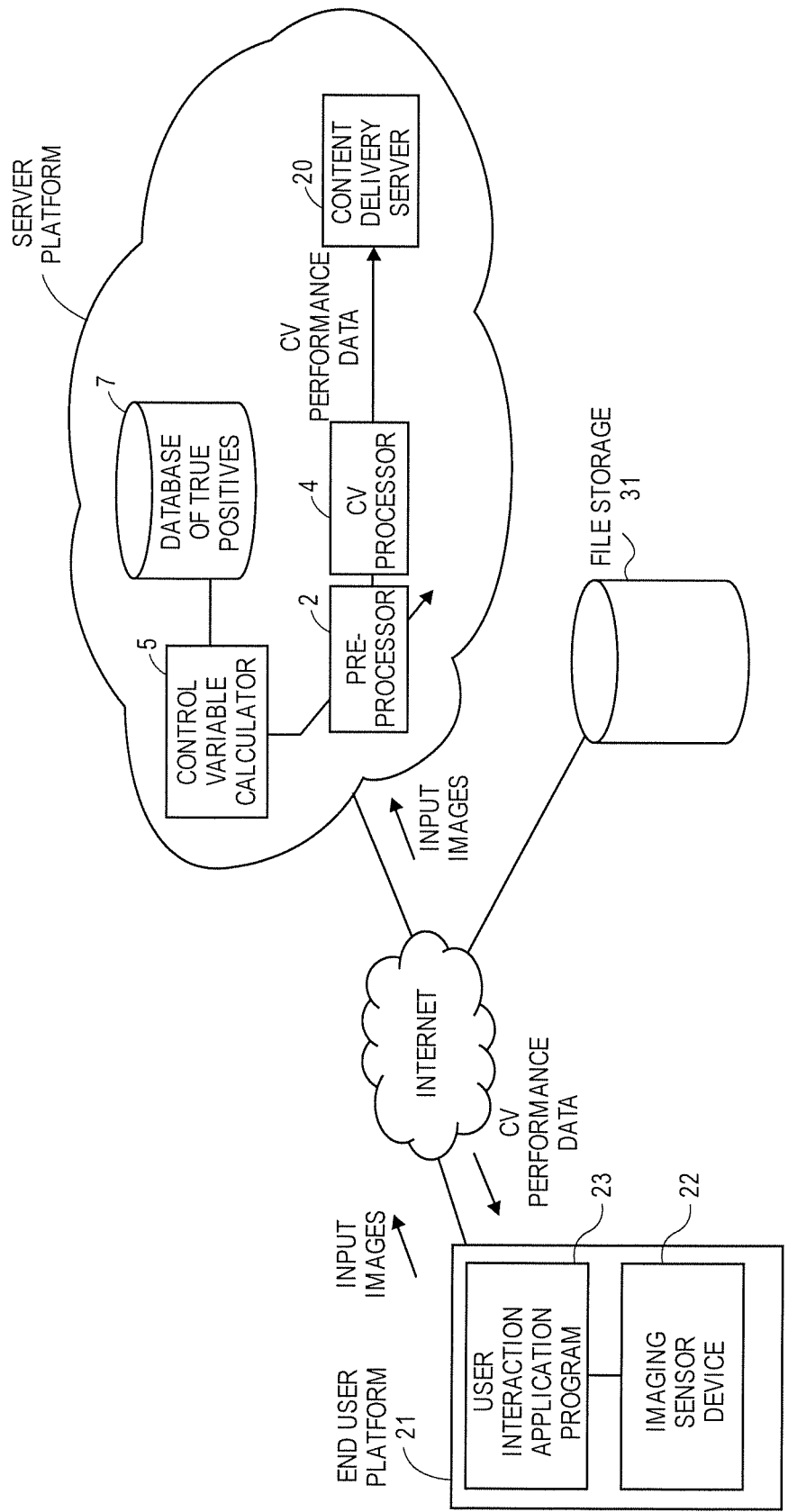
FIG. 3 depicts how a large part of a CV system may be implemented in a server platform.

Turning now to FIG. 3, this figure depicts how a large part of the CV system, including the control variable calculator 5, pre-processor 2, CV processor 4, and database 7, may be implemented in a server platform. The server platform may be one that provides content delivery services over the Internet, using a content delivery server 20 to communicate over the Internet with a client process that is running in for example an end user platform 21. The client process may be one that is being performed by a processor in the end user platform 21, that is executing for example a user interaction application program 23 as shown. The application program 23 may be one that performs still photography, video capture and editing, video conferencing, and social networking (with imaging functions). Other applications of course are contemplated. In this case, the content delivery service may include computer vision services such as any one of those listed above, including object or shape detection or recognition, gesture recognition, automatic inspection of objects, autonomous vehicle navigation, detecting events such as people counting, optical character recognition, road sign detection, medical imaging interpretation, surveillance algorithms, and organizing information such as databases of images.

In the case of the user interaction application program 23 running for example in a desktop computer, a video game console, an office video conferencing system, or other end user platform, or any other application program that needs computer vision tasks performed on its captured input images, the input images may be transmitted in real-time, i.e. as they are being captured by an imaging sensor device 22 (e.g., a digital camera device), to the server platform over the Internet, while CV performance data for the processed input images (processed by the CV system in the server platform) is received back from the content delivery server 20.

More generally, the computational load of the CV system described here can be distributed in various ways, across a client and a server, depending on criteria including power consumption optimization, bandwidth available, desired response time (latency), memory, or any other architectural or performance criteria. For example, the client may simply dispatch the captured images to the server for processing and then receive back the pre-processed image, i.e., pre-processed remotely, according to gain values that were updated by the control variable calculator 5 and the database 7 at the server; or, it may locally implement the computation of some or all of the metrics described above, and merely query the database 7, in the server, for matching entries, on the basis of which it would locally compute the gain settings for its locally-implemented SQ processors. How the computational and data storage workload is distributed among the client and the server may depend on the size of the images and their frame rate, in addition to analysis of the workloads and the resources and bandwidth between the client and the server.

Note that FIG. 3 is also being used here to depict another embodiment, namely one where the source of input images are from a file storage 31 that may be accessible via the Internet, where the input images were previously captured or otherwise produced and then stored in the file storage 31. The content delivery server 20 in that case would communicate with the file storage 31 to retrieve the input images. After having the input images processed or operated upon by the CV processor, the latter generating CV performance data on that basis, the server 20 may then send the CV performance data back to the file storage 31 where they are stored in association with the input images, or it may serve the CV performance data over the Internet to another client process running in another device—not shown). In all of these instances, a combination wired and wireless communication link that traverses the Internet (not shown) may be provided to upload the input images to the "cloud" (e.g., from a local device that may contain a digital camera which captured the image sequence, or that contains a still picture or moving picture file database). In one embodiment, an image mining application may be searching the picture file database in the local device (database platform 31) for certain content (a visual understanding application).

Figure 4:
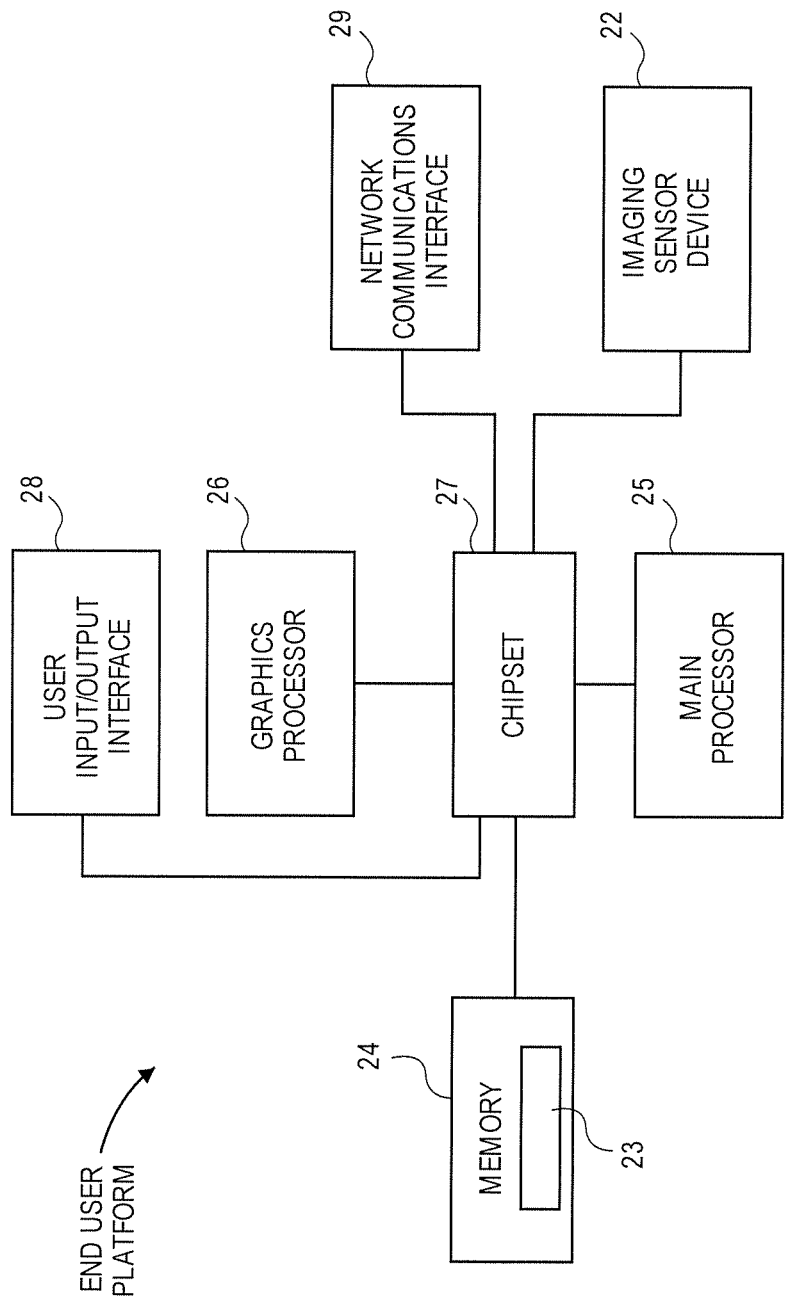
FIG. 4 is a block diagram of relevant hardware components of an end user platform in which parts of the CV system may be implemented.

In another embodiment, one or more of the SQ processors of the pre-processor 2, e.g. one that performs auto white balance, is implemented as a programmed digital image processor, which is physically inside the imaging sensor device 22, e.g. a digital camera module. The camera module may be part of an end user platform whose relevant hardware components are depicted in FIG. 4. The imaging sensor device 22 may include an imaging sensor, an imaging lens system and the pre-processor 2 (see FIG. 1). The camera module may be part of a more complex, multi-function system that constitutes the end user platform 21, such as a wearable computing device, e.g. a pair of smart glasses or a smart helmet or headset, an engineering workstation, a desktop computer, a laptop computer, a smartphone, a video game console, a television set top box, an entertainment system intended for use in a home or office, or a vehicle entertainment system. As shown in FIG. 4, such an end user platform may also include computer memory 24 in which the user interaction application program 23 is stored, a main processor 25 (e.g., a central processing unit, an applications processor) to execute the programs stored in the memory 24, a chipset 27 to enable communications between various hardware computing components, including a graphics processor 26, a user input/output interface 28 (e.g., a touch screen system) and a network communications interface 29 (e.g., a wireless local area network interface, an Ethernet interface, a Bluetooth interface, and/or a wireless cellular communications network interface). In a portable, end user platform, such as a wearable computing device, the CV system may be scaled down to have the minimum functionality needed for updating the gain variables of the pre-processing stage, and most if not all of the functionality of the CV system could also be implemented entirely in the end user platform. Alternatively, a client-server system may be implemented in which the computing tasks of the CV system are distributed between the client and the server. In one embodiment, if the CV system were designed to operate upon gray scale input images, then simpler algorithms may be used in the control variable calculator 5 to compute the metrics, in which case at least the control variable calculator 5 could be implemented locally in the client.

In the case where some elements of the CV system of FIG. 1 are implemented in an end user platform such as the one in FIG. 4, the pre-processor 2 (including the SQ processors and their control variable inputs) may be implemented within the imaging sensor device 22 (e.g., camera module) and is accessible through a communication bus, e.g. through the chipset 27, by the control variable calculator 5. Some portions of the control variable calculator 5, such as the signal quality comparator 12, may be implemented in the main processor 25 (FIG. 4) as programmed in accordance with software that is stored in the memory 24, while other portions such as the SC calculator 8, SS calculator 9 and the database 7 may be implemented in a cloud computing system. Note how the main processor 25 (FIG. 4) may be located outside of the camera module but within the housing of the more complex system.

It should also be noted that while the SQ processors are shown in FIG. 1 as separate blocks, in practice this is equivalent to the two or more of the SQ processors being implemented as a single, programmed microprocessor unit, or a "joint" processor, that combines the performance of the two or more conditioning processes, e.g. sharpness, noise and contrast, while still being responsive to their respective control variables.

More generally, an embodiment may be a machine-readable medium (such as any form of microelectronic memory including a distributed form as part of a cloud computing system) having stored thereon instructions which program one or more data processor components (generically referred to here as "a processor") to perform any suitable combination of the digital image processing and decision making operations described above for the control variable calculator 5 as part of a CV system (see FIG. 1). For example, selected portions of the CV system depicted in FIG. 1, or even all of the blocks depicted therein including the pre-processor 2, the control variable calculator 5, the database 7 and the CV processor 4, may be implemented as programmed data processors that reside in a "cloud" and as such the machine-readable medium in that case has stored therein instructions for programming "a processor in the cloud", e.g. a group of individual microprocessors or CPUs in a server platform, to perform the desired operations of the hardware components shown in FIG. 1. Of course, some of those operations may be performed by dedicated hardwired logic, e.g. dedicated digital filter blocks, and hardwired state machines, or by any combination of programmed data processing components and hardwired logic circuit components.

In another embodiment, a machine-readable medium may store the instructions that program a processor to perform the operations of the SC calculator 8 and SQ calculator 11 as part of the database population system depicted in FIG. 2. In yet another embodiment, a machine-readable medium may be the database 7 of true positives, where the medium in that case has stored therein the N entries containing the collected SC metrics and associated SQ values representing their respective true positive images.

An embodiment may be described as follows. An article of manufacture as part of a computer vision system has a computer readable medium (e.g., a "distributed" medium such as part of cloud computing system, or a medium that is located entirely within the housing of an end user platform) in which are stored instructions that program a processor to compute a measure of input image structural complexity of an input image, and search a database of true positives to find one or more entries in the database that represent true positive images that are structurally similar to the input image. The processor compares a measure of signal quality of the input image and a measure of signal quality of one of the true positive images, as retrieved from the database. Based on the comparison, the processor updates a control variable that configures a signal quality conditioning process that is to be performed on the input image prior to processing of the input image by a computer vision processor. In one aspect, the stored instructions program the processor to search the database of true positives by comparing the measure of input image structural complexity to one or more true positive complexity metrics that are stored in each of a number of entries in the database. In another aspect, the stored instructions program the processor to compare the measure of signal quality of the input image and the measure of signal quality of one of the true positive images, by computing a structural similarity metric that is a function of two or more of i) brightness metrics, ii) contrast metrics, iii) sharpness metrics, and iv) noise metrics. Examples of this approach are given above, e.g. the GSSM.

While certain embodiments have been described and shown in the accompanying drawings, it is to be understood that such embodiments are merely illustrative of and not restrictive on the broad disclosure here, and that the disclosure here is not limited to the specific constructions and arrangements shown and described, since various other modifications may occur to those of ordinary skill in the art. For example, although the pre-processor 2 is depicted in FIG. 1 as consisting of four SQ processors, an alternative is to have fewer than four SQ processors. Also, the imaging modality (the types of input images and true positive images) need not be limited to consumer electronic-based general photography, but also medical imaging, range imaging and depth imaging (using not just a visible light sensor but also an infrared light sensor, for example). The description is thus to be regarded as illustrative instead of limiting.

What is claimed is:

1. An image processing method for a computer vision system, comprising:
   processing an input image to compute a measure of input image structural complexity, of the input image;
   using a) the measure of input image structural complexity and b) a measure of true positive structural complexity, of a true positive image, computing a measure of structural similarity of the input image to the true positive image, wherein the true positive image is one that has resulted in a correct decision by a computer vision processor; and
   in response to the measure of structural similarity indicating sufficient similarity, performing a comparison between a measure of signal quality of the input image and a measure of signal quality of the true positive image and, based on the comparison, updating a control variable that configures a signal quality conditioning process that is performed on the input image prior to processing of the input image by a computer vision processor.

2. The method of claim 1 wherein the measure of input image structural complexity comprises an input image color or graylevel complexity metric, an input image lightness complexity metric, and an input image spatial complexity metric.

3. The method of claim 2 wherein the measure of true positive structural complexity comprises a true positive color or graylevel complexity metric, a true positive lightness complexity metric, and a true positive spatial complexity metric.

4. The method of claim 3 wherein the measure of structural similarity is a function of two or more of i) the input image and true positive color or graylevel complexity metrics, ii) the input image and true positive lightness complexity metrics and iii) the input image and true positive spatial complexity metrics.

5. The method of claim 1 further comprising accessing a database having a plurality of entries, wherein each entry comprises a plurality of true positive structural complexity metrics associated with a plurality of true positive signal quality metrics,
   wherein the plurality of true positive structural complexity metrics were derived from a respective one or more true positive images, and the plurality of true positive signal quality metrics were derived from the respective one or more true positive images,
   wherein the database is accessed to retrieve one or more of the plurality of true positive structural complexity metrics in a given entry,
   and wherein computing the measure of structural similarity uses a) one or more of a plurality of input image complexity metrics derived from the input image, and b) said one or more of the plurality of true positive structural complexity metrics retrieved from the given entry in the database.

6. The method of claim 5 wherein the plurality of input image complexity metrics comprise an input image color or graylevel complexity metric, an input image lightness complexity metric and an input image spatial complexity metric,
   and wherein computing the measure of structural similarity comprises computing a structural similarity metric that is a function of
   a) two or more of i) the input image color or graylevel complexity metric, ii) the input image lightness complexity metric and iii) the input image spatial complexity metric, and
   b) a corresponding two or more of the plurality of true positive structural complexity metrics retrieved from the given entry in the database.

7. The method of claim 1 wherein updating the control variable, that configures a signal quality conditioning process that is performed on the input image prior to processing of the input image by a computer vision processor, comprises increasing or decreasing the control variable in proportion to how much a) the measure of signal quality of the true positive image, is greater than or less than b) the measure of signal quality of the input image.

8. An image processing system, comprising:
   a processor; and
   memory having stored therein instructions that when executed by the processor
      compute a measure of input image structural complexity, of an input image;
      compute a measure of signal quality of the input image;
      retrieve one or more of the plurality of true positive structural complexity metrics in a given entry of the database, and compute a structural similarity metric using a) the measure of input image structural complexity and b) the one or more true positive structural complexity metrics retrieved from the database; and
      perform a comparison between the measure of signal quality of the input image and the true positive signal quality metric retrieved from the database, wherein in response to the structural similarity metric indicating sufficient similarity, a control variable is updated in accordance with the comparison, wherein the control variable configures a pre-processor of a computer vision system.

9. The system of claim 8 wherein the measure of input image structural complexity comprises an input image color or graylevel complexity metric, an input image lightness complexity metric, and an input image spatial complexity metric.

10. The system of claim 9 wherein the plurality of true positive structural complexity metrics comprise a true positive color or graylevel complexity metric, a true positive lightness complexity metric, and a true positive spatial complexity metric.

11. The system of claim 10 wherein the measure of structural similarity is a function of two or more of i) the input image and true positive color or graylevel complexity metrics, ii) the input image and true positive lightness complexity metrics and iii) the input image and true positive spatial complexity metrics.

12. The system of claim 11 wherein the pre-processor comprises two or more of a brightness processor, a sharpness processor, contrast processor, and a noise reduction processor, that are configurable by two or more control variables, respectively.

13. The system of claim 11 wherein the memory has stored therein instructions that when executed by the processor compute the structural similarity metric using a) one or more, but not all, of a plurality of input image complexity metrics that have been derived from the input image, and b) a corresponding one or more, but not all, of the true positive structural complexity metrics in the given entry in the database.

14. The system of claim 11 wherein the memory has stored therein instructions that when executed by the processor update the control variable in accordance with the comparison, by increasing or decreasing the control variable in proportion to how much a) the measure of signal quality of the true positive image, is greater than or less than b) the measure of signal quality of the input image.

15. The system of claim 11 wherein the processor and memory are in a server, and wherein the server is to receive the input image from an end user platform or from a file storage via communication over the Internet.

16. The system of claim 11 in combination with a server, wherein the server is to provide the received input image to the computer vision processor and to the processor, and then serve performance data from the computer vision processor, wherein the performance data is generated by the computer vision processor based on having operated upon the input image, over the Internet.

17. An article of manufacture for a computer vision system, comprising a non-transitory computer readable medium having stored thereon instructions that program a processor to compute a measure of input image structural complexity of an input image, and search a database of true positives to find one or more entries in the database that represent true positive images that are structurally similar to the input image, the processor to compare a measure of signal quality of the input image and a measure of signal quality of one of the true positive images, as retrieved from the database, and based on the comparison, update a control variable that configures a signal quality conditioning process that is to be performed on the input image prior to processing of the input image by a computer vision processor.

18. The article of manufacture of claim 17 wherein the stored instructions program the processor to search the database of true positives by comparing the measure of input image structural complexity to one or more true positive complexity metrics that are stored in each of a plurality of entries in the database.

19. The article of manufacture of claim 17 wherein the stored instructions program the processor to compare the measure of signal quality of the input image and the measure of signal quality of one of the true positive images by computing a structural similarity metric that is a function of two or more of i) brightness metrics, ii) contrast metrics, iii) sharpness metrics, and iv) noise metrics.

* * * * *